US012761724B2

(12) United States Patent
Zhou et al.

(10) Patent No.: US 12,761,724 B2
(45) Date of Patent: Oct. 13, 2026

(54) VIDEO GENERATION METHOD, READABLE MEDIUM, AND ELECTRONIC DEVICE

(71) Applicant: Beijing Zitiao Network Technology Co., Ltd., Beijing (CN)

(72) Inventors: Qixian Zhou, Beijing (CN); Wanting He, Beijing (CN); Canjie Yao, Beijing (CN); Haoming Xu, Beijing (CN); Li Zhong, Beijing (CN); Ruosong Wang, Beijing (CN); Jingheng Zhang, Beijing (CN)

(73) Assignee: Beijing Zitiao Network Technology Co., Ltd., Beijing (CN)

(*) Notice: Subject to any disclaimer, the term of this patent is extended or adjusted under 35 U.S.C. 154(b) by 176 days.

(21) Appl. No.: 18/916,328

(22) Filed: Oct. 15, 2024

(65) Prior Publication Data

US 2025/0209762 A1 Jun. 26, 2025

(30) Foreign Application Priority Data

Dec. 26, 2023 (CN) ......................... 202311816827.5

(51) Int. Cl.

| | |
|---|---|
| ***G06F 3/01*** | (2006.01) |
| ***G06F 3/04815*** | (2022.01) |
| ***G06F 3/04842*** | (2022.01) |
| ***G06T 13/40*** | (2011.01) |
| ***G06T 19/20*** | (2011.01) |
| ***G11B 27/031*** | (2006.01) |

(Continued)

(52) U.S. Cl.

CPC .......... *G06F 3/011* (2013.01); *G06F 3/04815* (2013.01); *G06F 3/04842* (2013.01); *G06T 13/40* (2013.01); *G06T 19/20* (2013.01); *G11B 27/031* (2013.01); *H04N 21/431* (2013.01); *H04N 21/44* (2013.01); *H04N 21/4781* (2013.01); *H04N 21/81* (2013.01); *G06T 2219/2004* (2013.01)

(58) Field of Classification Search

None

See application file for complete search history.

(56) References Cited

U.S. PATENT DOCUMENTS

2022/0032186 A1* 2/2022 Wan ...................... G06F 3/0484
2024/0193894 A1* 6/2024 Zong ...................... A63F 13/52

(Continued)

FOREIGN PATENT DOCUMENTS

CN 113903067 A 1/2022
CN 115942039 A * 4/2023
WO WO-2023142415 A1 * 8/2023 ............ G06T 11/60

*Primary Examiner* — Jwalant Amin

(74) *Attorney, Agent, or Firm* — Alleman Hall LLP

(57) ABSTRACT

A video generation method and apparatus, a readable medium, and an electronic device are provided. The method includes: in response to a virtual object controlled by a user moving to a target virtual region in a virtual space, obtaining video text information of a target video, in which the video text information is configured to indicate at least one target virtual object included in the target video and at least one action performed by the at least one target virtual object; the target virtual object performing the at least one action in the virtual space based on the video text information; and in response to the at least one action being completed, generating a target video corresponding to the video text information.

20 Claims, 3 Drawing Sheets

(51) Int. Cl.

| | |
|---|---|
| ***H04N 21/431*** | (2011.01) |
| ***H04N 21/44*** | (2011.01) |
| ***H04N 21/478*** | (2011.01) |
| ***H04N 21/81*** | (2011.01) |

(56) References Cited

U.S. PATENT DOCUMENTS

| | | | | |
|---|---|---|---|---|
| 2024/0320891 | A1* | 9/2024 | Chen | A63F 13/52 |
| 2025/0010185 | A1* | 1/2025 | Fu | A63F 13/52 |

* cited by examiner

VIDEO GENERATION METHOD, READABLE MEDIUM, AND ELECTRONIC DEVICE

CROSS-REFERENCE TO RELATED APPLICATION

This application claims the priority of Chinese Patent Application No. 202311816827.5 filed on Dec. 26, 2023, the disclosure of which is incorporated by reference herein in its entirety as part of the present application.

TECHNICAL FIELD

The present disclosure relates to the field of computer technologies, and in particular, to a video generation method and apparatus, a readable medium, and an electronic device.

BACKGROUND

With the development of multimedia technologies, video sharing has gradually become mainstream in users' daily life. Generally, a user can control a virtual object (for example, a person or an item) in a virtual space, and record the process to form a video for sharing. For example, the user can record scenery, a person, or the like in a game to obtain a video for sharing. In the related art, when it comes to video generation involving the virtual space and the virtual object, the user generally needs to manually start recording, control in real time, and manually end recording, which requires the user to conceive in advance and perform a lot of operations, resulting in low convenience and low efficiency. In addition, because the operations of the user are generally difficult to achieve flexible and changeable levels, the generated video also has a problem of single effect and insufficient diversity.

SUMMARY

The Summary is provided to introduce the concepts in a simplified form, which will be described in detail in the following Detailed Description of embodiments. The Summary is not intended to identify key features or necessary features of the claimed technical solutions, nor is it intended to limit the scope of the claimed technical solutions.

According to a first aspect, the present disclosure provides a video generation method, the method comprises:

- in response to a virtual object controlled by a user moving to a target virtual region in a virtual space, obtaining video text information of a target video, in which the video text information is configured to indicate at least one target virtual object included in the target video and at least one action performed by the at least one target virtual object;
- the target virtual object performing the at least one action in the virtual space based on the video text information; and
- in response to the at least one action being completed, generating the target video corresponding to the video text information.

According to a second aspect, the present disclosure provides a video generation apparatus, the apparatus comprises:

- an obtaining module, configured to: in response to a virtual object controlled by a user moving to a target virtual region in a virtual space, obtain video text information of a target video, in which the video text information is configured to indicate at least one target virtual object included in the target video and at least one action performed by the at least one target virtual object;
- an execution module, configured to allow the target virtual object to perform the at least one action in the virtual space based on the video text information; and
- a first generation module, configured to: in response to the at least one action being completed, generate the target video corresponding to the video text information.

According to a third aspect, the present disclosure provides a computer-readable medium having a computer program stored thereon, when the program is executed by a processing apparatus, steps of the method according to the first aspect of the present disclosure are implemented.

According to a fourth aspect, the present disclosure provides an electronic device, which comprises:

- a storage apparatus having a computer program stored thereon; and
- a processing apparatus configured to execute the computer program in the storage apparatus to implement steps of the method according to the first aspect of the present disclosure.

Other features and advantages of the present disclosure will be described in detail in the following Detailed Description of embodiments.

BRIEF DESCRIPTION OF DRAWINGS

The above and other features, advantages, and aspects of the embodiments of the present disclosure become more apparent with reference to the following specific embodiments and in conjunction with the accompanying drawings. Throughout the drawings, the same or similar reference numerals denote the same or similar elements. It should be understood that the accompanying drawings are schematic and components and elements are not necessarily drawn to scale. In the drawings.

DETAILED DESCRIPTION

Figure 1:
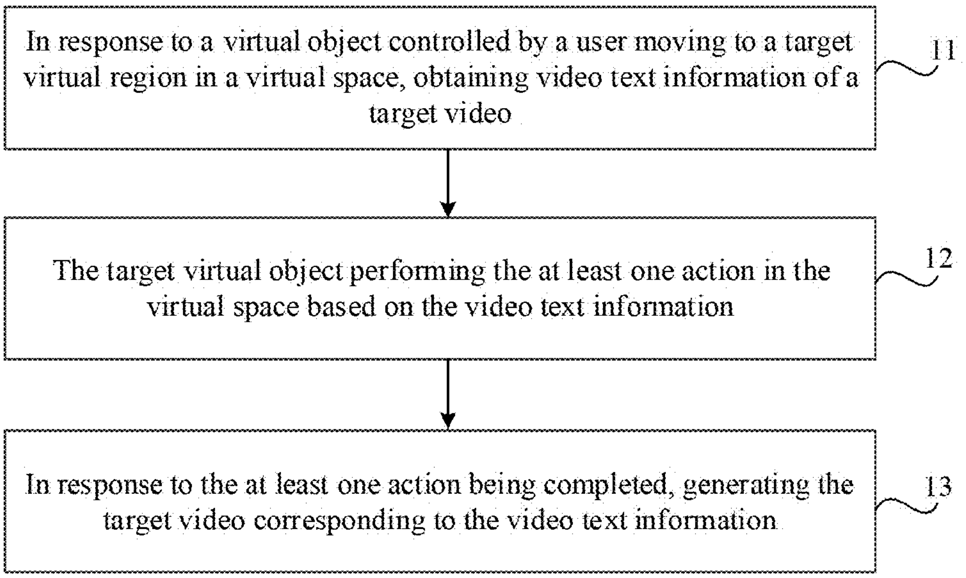
FIG. 1 is a flowchart of a video generation method according to an embodiment of the present disclosure.

Embodiments of the present disclosure are described in more detail below with reference to the drawings. Although certain embodiments of the present disclosure are shown in the drawings, it should be understood that the present disclosure may be achieved in various forms and should not be construed as being limited to the embodiments described here. On the contrary, these embodiments are provided to understand the present disclosure more clearly and completely. It should be understood that the drawings and the embodiments of the present disclosure are only for exemplary purposes and are not intended to limit the scope of protection of the present disclosure.

It should be understood that various steps recorded in the implementation modes of the method of the present disclosure may be performed according to different orders and/or performed in parallel. In addition, the implementation modes of the method may include additional steps and/or steps omitted or unshown. The scope of the present disclosure is not limited in this aspect.

The term "including" and variations thereof used in this article are open-ended inclusion, namely "including but not limited to". The term "based on" refers to "at least partially based on". The term "one embodiment" means "at least one embodiment"; the term "another embodiment" means "at least one other embodiment"; and the term "some embodiments" means "at least some embodiments". Relevant definitions of other terms may be given in the description hereinafter.

It should be noted that concepts such as "first" and "second" mentioned in the present disclosure are only used to distinguish different apparatuses, modules or units, and are not intended to limit orders or interdependence relationships of functions performed by these apparatuses, modules or units.

Modifications of "one" and "more" mentioned in the present disclosure are schematic rather than restrictive, and those skilled in the art should understand that unless otherwise explicitly stated in the context, it should be understood as "one or more".

The names of messages or information exchanged between a plurality of apparatuses in the implementations of the present disclosure are used for illustrative purposes only, and are not used to limit the scope of these messages or information.

It can be understood that before the technical solution disclosed in each embodiment of the present disclosure is used, the user should be informed of the type, use scope, use scenario, and the like of the personal information involved in the present disclosure in an appropriate manner in accordance with relevant laws and regulations, and the user's authorization should be obtained.

For example, when a user's active request is received, prompt information is sent to the user to explicitly prompt the user that the operation requested by the user will need to obtain and use the user's personal information. Therefore, the user can independently choose whether to provide personal information to software or hardware such as an electronic device, an application, a server, or a storage medium that executes the operation of the technical solution of the present disclosure based on the prompt information.

As an optional but non-limiting implementation, in response to receiving the user's active request, for example, the prompt information may be sent to the user in a pop-up window, and the prompt information may be presented in the pop-up window in text. In addition, the pop-up window may also carry a selection control for the user to select "agree" or "disagree" to provide personal information to the electronic device.

It can be understood that the above notification and user authorization obtaining process are only illustrative and do not limit the implementations of the present disclosure. Other methods that comply with relevant laws and regulations may also be applied to the implementations of the present disclosure.

In addition, it can be understood that the data involved in this technical solution (including but not limited to the data itself, the acquisition or use of data) should comply with the requirements of corresponding laws and regulations and related regulations.

FIG. 1 is a flowchart of a video generation method according to an embodiment of the present disclosure. For example, the embodiments of the present disclosure may be applied to scenarios such as games, virtual reality, and augmented reality. As shown in FIG. 1, the method provided by the present disclosure may include steps 11 to 13.

Step 11: in response to a virtual object controlled by a user moving to a target virtual region in a virtual space, obtaining video text information of a target video.

The virtual object in the embodiments of the present disclosure may be a living thing or a non-living thing, the living thing includes but is not limited to a person, an animal, a plant, etc., and the non-living thing includes but is not limited to an item, a vehicle, etc.

The virtual space includes different virtual regions. In these virtual regions, at least one virtual region may be set as the target virtual region according to actual requirements, so that when the user controls the virtual object to move to the target virtual region, subsequent target video generation is automatically triggered.

Figure 2:
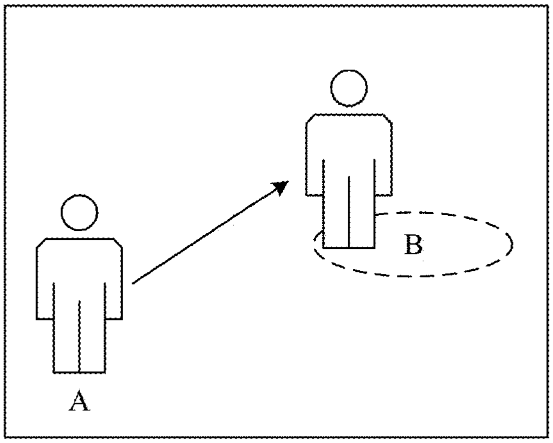
FIG. 2 is a schematic diagram of an interface according to an embodiment of the present disclosure.

For example, assuming that the virtual object is a person A and the target virtual region is a region B, as shown in FIG. 2, when the person A is currently located at a position other than the region B, when the user controls the person A to move to the region B in the direction of the arrow in FIG. 2, it is equivalent to the virtual object controlled by the user moving to the target virtual region in the virtual space.

When the virtual object controlled by the user moves to the target virtual region, in response to this, the video text information of the target video may be obtained.

The video text information may be configured to indicate at least one target virtual object included in the target video and at least one action performed by the at least one target virtual object. In this way, the video text information may reflect what kind of virtual object should be included and what action should be performed by the virtual object in the target video expected to be generated.

For example, the video text information may be "object H1 and object H2 are walking in a park", and it may be determined that the video text information includes two target virtual objects, that is, the object H1 and the object H2, and each virtual object performs the action of "walking" respectively.

In a possible implementation, in step 11, obtaining video text information of a target video may include the following steps:

obtaining input text information of the user; and generating and presenting video text information based on the input text information.

In this implementation, the user inputs a text to generate the input text information, and then after the text information input by the user is obtained, the video text information is generated based on the input text information and used as the video text information of the target video.

For example, a text box for the user to input the text may be first presented to the user, and then the input text information of the user is obtained according to the input content of the user in the text box.

After the input text information of the user is obtained, the video text information may be generated and presented based on the input text information.

In a possible embodiment, when the input text information of the user already includes the target virtual object and the at least one action performed by the target virtual object, the input text information may be directly used as the video text information.

In another possible embodiment, when the information in the input text information is relatively brief and the target virtual object or the action of the target virtual object is missing, text expansion processing may be performed based on the input text information to obtain the expanded video text information including the target virtual object and the action performed by the target virtual object. For example, the above text expansion processing may be performed through artificial intelligence technologies.

In a possible implementation, the video text information may be directly generated and presented with reference to the above manner based on the input text information.

In another possible implementation, a function of further editing may also be provided to the user. Correspondingly, generating and presenting video text information based on the input text information may include the following steps:

generating and presenting original text information based on the input text information; and in response to an edit operation for the original text information by the user, generating the video text information.

The manner of generating the original text information based on the input text information is similar to the manner of generating the video text information based on the input text information described above, and details are not described herein again.

After the original text information is generated, the original text information may be presented for the user to view, confirm, and edit. The user may perform a further edit operation based on the presented original text information, for example, modify the target virtual object, modify the action, etc., and then the edited text information is obtained according to the edit operation of the user and used as the video text information.

In this way, by providing an edit entry to the user, the user can edit the generated text information, so that the finally obtained video text information can better meet the needs of the user.

In another possible implementation, the generated video text information may be obtained. For example, a button for generating the video text information may be first presented to the user, and then the video text information is generated according to a trigger operation of the user for the button, to directly obtain the video text information. For example, the above video text information may be randomly generated through artificial intelligence technologies.

In this way, the video text information of the target video may be directly obtained without the need for the user to input, thereby reducing the workload of the user.

Step 12: the target virtual object performing the at least one action in the virtual space based on the video text information.

Because the video text information includes the at least one target virtual object and the at least one action performed by the at least one target virtual object in the virtual space, the target virtual object can perform the at least one action in the virtual space based on the video text information. It should be noted that when there are more than one target virtual object, each target virtual object may respectively correspond to at least one action that needs to be performed. When performing the action, the target virtual object only needs to perform the at least one action corresponding to the target virtual object itself.

For example, the virtual space may include a plurality of virtual regions, and one virtual region in the virtual space may also be referred to as one virtual scene. Based on this, the target virtual object performs the at least one action in the virtual space, that is, the target virtual object performs the at least one action in a specified virtual scene (or virtual region) in the virtual space.

Therefore, the target virtual scene related to the target video may be determined, and in the subsequent step, the target virtual object can perform the at least one action in the target virtual scene in the virtual machine space based on the video text information. There may be one target virtual scene or more than one target virtual scene.

In a possible implementation, after the step 11 of obtaining video text information of a target video, the method provided by the present disclosure may further include the following steps:

presenting a virtual scene selection interface; and receiving a scene selection instruction input by the user, and determining a target virtual scene related to the target video.

Figure 3:
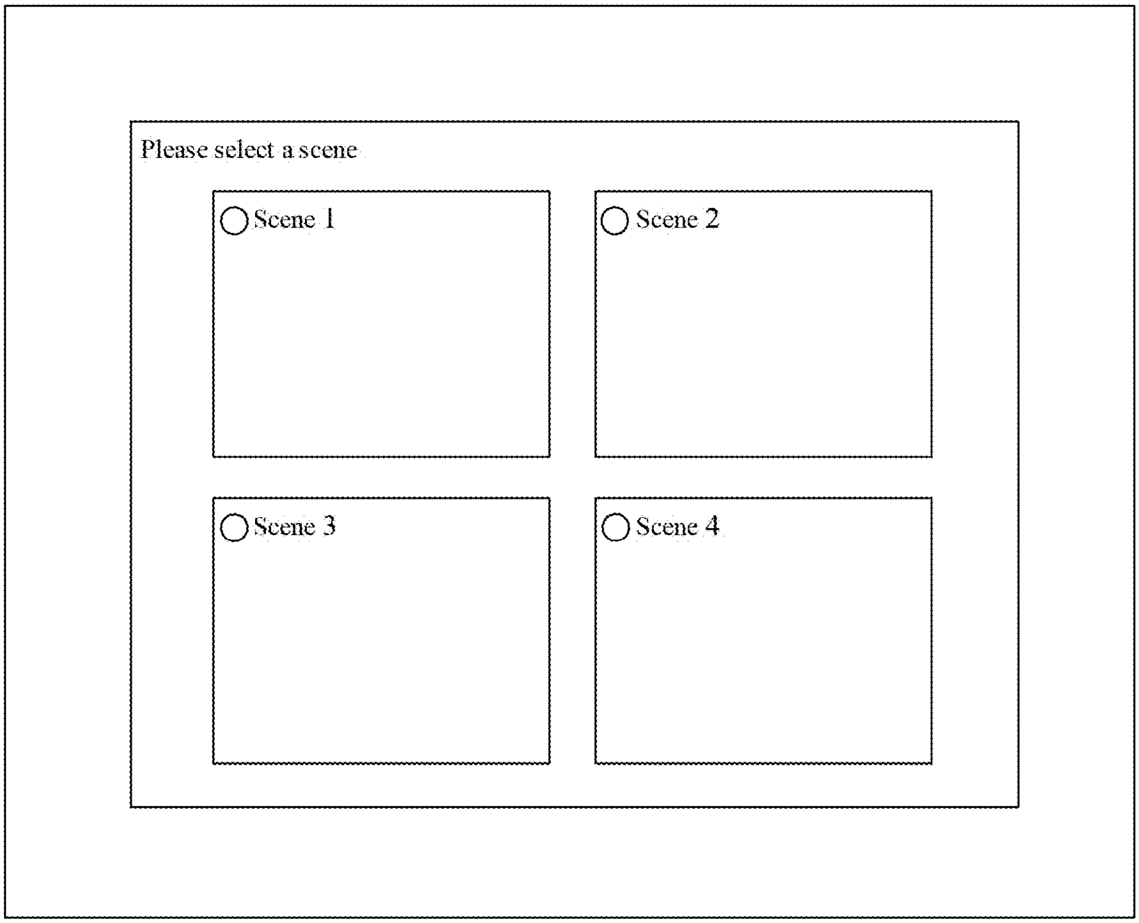
FIG. 3 is a schematic diagram of an interface according to an embodiment of the present disclosure.

The virtual scene selection interface may present at least two selectable virtual regions in the virtual space. For example, the virtual scene selection interface may be presented in the manner shown in FIG. 3, in which four scenes, namely, scene 1, scene 2, scene 3, and scene 4, are presented for the user to select.

After the virtual scene selection interface is presented, the scene selection instruction input by the user may be received, the scene selection instruction may be used to indicate a virtual region selected by the user from the selectable virtual regions. Furthermore, the target virtual scene related to the target video may be determined based on the virtual region indicated by the scene selection instruction.

In the above manner, the selectable virtual regions are presented to the user through the virtual scene selection interface, which is convenient for the user to visually observe the scene images of the virtual regions, and then select the virtual region as the target virtual scene as required.

In another possible implementation, after the step 11 of obtaining video text information of a target video, the method provided by the present disclosure may further include the following steps:

determining a selectable virtual region in the virtual space based on the video text information; and receiving a scene confirmation instruction input by the user, and determining a target virtual scene related to the target video.

For example, in addition to the target virtual object and the action performed by the target virtual object, the video text information may further include the selectable virtual region in the virtual space. Furthermore, the selectable virtual region in the virtual space may be determined based on the video text information.

Taking the example of the video text information of "object H1 and object H2 are walking in a park" given above as an example, it can be learned that the selectable virtual region therein is the "park".

For example, when the video text information does not include the selectable virtual region in the virtual space, a proper selectable virtual region may also be determined according to the content of the video text information. For example, when the video text information is "object H3 and object H4 eat first, and then go shopping", it may be reasonably determined that the selectable virtual region may be a region (for example, a restaurant) where the action of "eating" can be performed and a region (for example, a shopping mall) where the action of "shopping" can be performed.

The selectable virtual region in the virtual space determined based on the video text information may be presented to the user for the user to confirm. For example, the selectable virtual region may be presented in the form of a text, an image, a video, etc.

In this way, the user may input the scene confirmation instruction through an operation, and the target virtual scene related to the target video may be determined based on the scene confirmation instruction of the user.

For example, the scene confirmation instruction may be used to agree to use the selectable virtual region determined based on the video text information as the target virtual scene related to the target video.

For example, the scene confirmation instruction may be used to disagree to use the selectable virtual region determined based on the video text information as the target virtual scene related to the target video. In this case, the scene confirmation instruction may carry information of another virtual region, and then the virtual region indicated by the information carried in the scene confirmation instruction may be used as the target virtual scene related to the target video.

In the above manner, the selectable virtual region in the virtual space may be automatically determined through the video text information for the user to directly confirm. Because the video text information itself can reflect the virtual region where the action should be performed to a certain extent, the selectable virtual region determined based on this can be more in line with the video text information and more reasonable.

In another possible implementation, after the step of determining a target virtual scene related to the target video, the method provided by the present disclosure may further include the following step:

in response to there being a plurality of target virtual scenes, respectively determining an action corresponding to each of the target virtual scenes in the video text information.

When a plurality of target virtual scenes are determined, it indicates that the target virtual scenes corresponding to the at least one action specified by the target virtual object may be different. Therefore, it is necessary to respectively determine the action corresponding to each target virtual scene in the video text information.

For example, when the video text information is "object H5 and object H6 cat in a restaurant, and then go shopping in a shopping mall", it can be learned that the target virtual objects include the object H5 and the object H6, both of which perform two actions of "eating" and "shopping", and the target virtual scenes include the "restaurant" and the "shopping mall". Therefore, for the object H5, it may be determined that the action corresponding to the target virtual scene "restaurant" is "eating", and the action corresponding to the target virtual scene "shopping mall" is "shopping". The same applies to the object H6 (because in the text, the object H5 and the object H6 act together).

In this way, the action performed by each target virtual object may be separately determined for different target virtual scenes, to ensure that the actions performed by the target virtual objects can be accurately and orderly performed without confusion.

For example, after the step of determining a target virtual scene related to the target video, the method provided by the present disclosure may further include the following step:

in response to the target virtual region being a first-type virtual region, generating a scene image corresponding to the target virtual scene, and rendering the scene image in a background presentation sub-region of the target virtual region.

The target virtual region may be correspondingly provided with category information, which is configured to indicate that the target virtual region is a first-type virtual region or a second-type virtual region.

When the target virtual region is the first-type virtual region, a scene image corresponding to the target virtual scene may be generated. For example, the scene image corresponding to the target virtual scene may be generated by shooting a picture in the target virtual scene through a virtual camera.

After the scene image is generated, the scene image may be rendered in the background presentation sub-region of the target virtual region. In this way, when the target virtual object performs an action in the target virtual scene, the background of the target virtual object is rendered as the scene image. In this way, the target video generated when the first-type virtual region is triggered is a video showing a two-dimensional picture with the target virtual scene.

For example, the target virtual object performing the at least one action in the virtual space based on the video text information may include the following step:

in response to the target virtual region being a second-type virtual region, based on the video text information, the target virtual object moving to the target virtual scene, and performing the at least one action.

When the target virtual region is the second-type virtual region, the target virtual object needs to switch the scene by moving, to move to the target virtual scene, and then perform the at least one action corresponding to the target virtual scene. In this way, the target video generated when the second-type virtual region is triggered is a video showing a three-dimensional picture after the target virtual object actually enters the target virtual scene.

In the above manner, different types of target virtual regions are preset, and the user can automatically trigger generation of target videos with different characteristics, such as a two-dimensional background video or a three-dimensional live-action video, by controlling the virtual object to move to the target virtual regions of different types, which improves the diversity of the target video and the convenience of the user operation.

Step 13: in response to the at least one action being completed, generating the target video corresponding to the video text information.

During the process of the target virtual object performing the action, the target virtual object may be recorded through a virtual camera in the virtual space. For example, according to actual requirements, the virtual camera may be controlled to a fixed camera position or a moving camera position, in which a moving path may also be automatically generated or set according to actual requirements. Therefore, after the at least one action of the target virtual object is completed, a recorded video may be obtained and used as the target video corresponding to the video text information.

According to the above technical solution, when the virtual object controlled by the user moves to the target virtual region in the virtual space, the video text information is obtained, the video text information is configured to indicate at least one target virtual object included in the target video expected to be generated and at least one action performed by the virtual object. Therefore, based on the video text information, the target virtual object can perform the at least one action in the virtual space, and in response to the at least one action being completed, the target video corresponding to the video text information can be generated. In this way, the user can control the virtual object to move to the target virtual region to trigger the obtaining of the video text information, so that the target virtual object can automatically perform a series of actions in the virtual space based on the video text information, and after the actions are completed, the corresponding target video is generated. On the one hand, the user can automatically trigger generation of the above target video based on the operation of controlling the virtual object to move to the target virtual region, which makes video generation more convenient and efficient. On the other hand, the obtained video text information is diversified and is no longer limited to conception and operation of the user, which makes the generated video more diversified.

Figure 4:
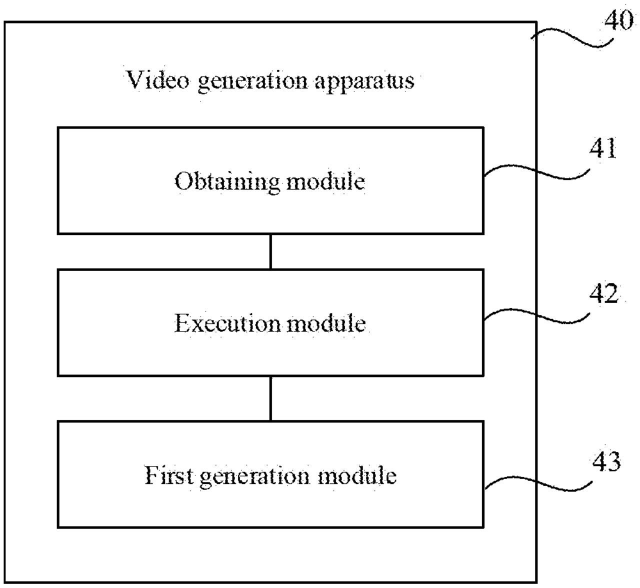
FIG. 4 is a block diagram of a video generation apparatus according to an embodiment of the present disclosure.

FIG. 4 is a block diagram of a video generation apparatus according to an embodiment of the present disclosure. As shown in FIG. 4, the apparatus 40 may include:

- an obtaining module 41, configured to: in response to a virtual object controlled by a user moving to a target virtual region in a virtual space, obtain video text information of a target video, in which the video text information is configured to indicate at least one target virtual object included in the target video and at least one action performed by the at least one target virtual object;
- an execution module 42, configured to, allow the target virtual object to perform the at least one action in the virtual space based on the video text information; and
- a first generation module 43, configured to: in response to the at least one action being completed, generate the target video corresponding to the video text information.

For example, the obtaining module 41 includes:

- an obtaining sub-module, configured to obtain input text information of the user; and
- a first generation sub-module, configured to generate and present the video text information based on the input text information.

For example, the first generation sub-module includes:

- a second generation sub-module, configured to generate and present original text information based on the input text information; and
- a third generation sub-module, configured to: in response to an edit operation for the original text information by the user, generate the video text information.

For example, the apparatus 40 further includes:

- a presentation module, configured to, after the obtaining module 41 obtains video text information of a target video, present a virtual scene selection interface, in which the virtual scene selection interface presents at least two selectable virtual regions in the virtual space; and
- a first receiving module, configured to receive a scene selection instruction input by the user, and determine a target virtual scene related to the target video.

For example, the apparatus 40 further includes:

- a first determination module, configured to, after the obtaining module 41 obtains video text information of a target video, determine a selectable virtual region in the virtual space based on the video text information; and
- a second determination module, configured to receive a scene confirmation instruction input by the user, and determine a target virtual scene related to the target video.

For example, the apparatus 40 further includes:

- a third determination module, configured to, after the target virtual scene related to the target video is determined, in response to there being a plurality of target virtual scenes, respectively determine the action corresponding to each of the target virtual scenes in the video text information.

For example, the apparatus 40 further includes:

- a second generation module, configured to, after the target virtual scene related to the target video is determined, in response to the target virtual region being a first-type virtual region, generate a scene image corresponding to the target virtual scene, and render the scene image in a background presentation sub-region of the target virtual region.

For example, the execution module 42 includes:

- an execution sub-module, configured to: in response to the target virtual region being a second-type virtual region, based on the video text information, allow the target virtual object to move to the target virtual scene, and perform the at least one action.

The specific manners in which the various modules perform operations in the above apparatus have been described in detail in the embodiments related to the method, and will not be detailed herein.

Based on the same concept, the embodiments of the present disclosure further provide a computer-readable medium having a computer program stored thereon, when the program is executed by a processing apparatus, the steps of the above video generation method are implemented.

Based on the same concept, the embodiments of the present disclosure further provide an electronic device, which includes:

- a storage apparatus having a computer program stored thereon; and
- a processing apparatus configured to execute the computer program in the storage apparatus to implement the steps of the above video generation method.

Figure 5:
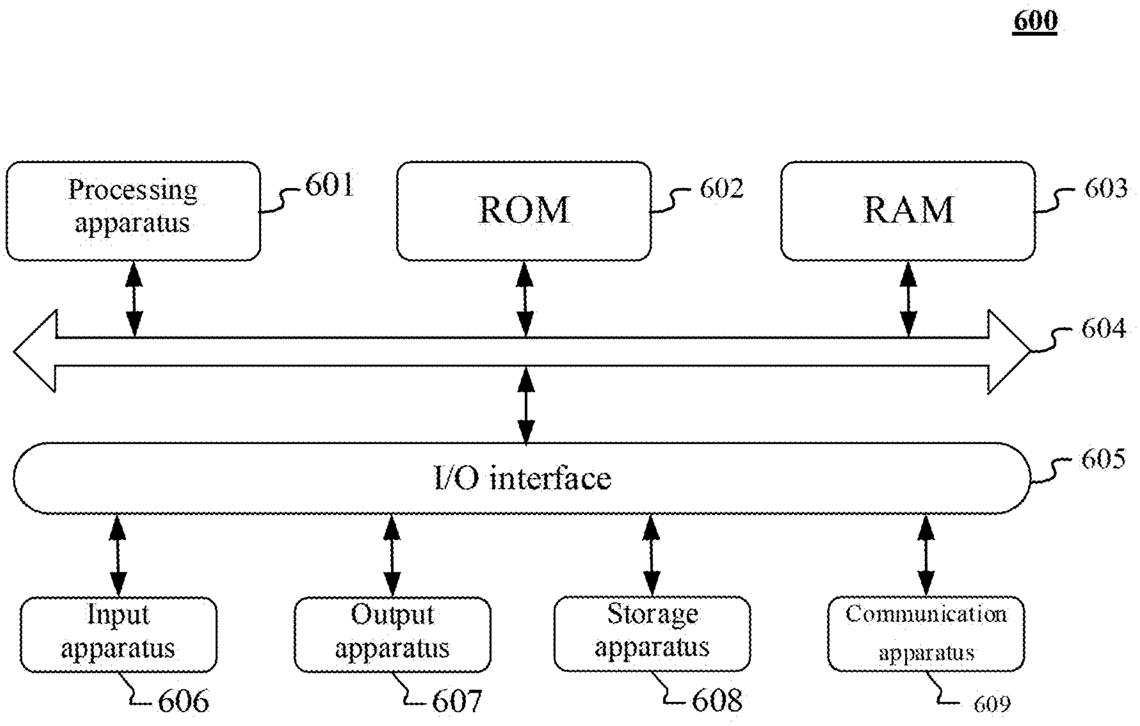
FIG. 5 is a structural schematic diagram of an electronic device suitable for implementing the embodiments of the present disclosure.

Referring to FIG. 5, FIG. 5 illustrates a schematic structural diagram of an electronic device 600 suitable for implementing some embodiments of the present disclosure. The electronic devices in some embodiments of the present disclosure may include but are not limited to mobile terminals such as a mobile phone, a notebook computer, a digital broadcasting receiver, a personal digital assistant (PDA), a portable Android device (PAD), a portable media player (PMP), a vehicle-mounted terminal (e.g., a vehicle-mounted navigation terminal), a wearable electronic device or the like, and fixed terminals such as a digital TV, a desktop computer, or the like. The electronic device illustrated in FIG. 6 is merely an example, and should not pose any limitation to the functions and the range of use of the embodiments of the present disclosure.

As illustrated in FIG. 5, the electronic device 600 may include a processing apparatus 501 (e.g., a central processing unit, a graphics processing unit, etc.), which can perform various suitable actions and processing according to a program stored in a read-only memory (ROM) 602 or a program loaded from a storage apparatus 508 into a random-access memory (RAM) 603. The RAM 603 further stores various programs and data required for operations of the electronic device 600. The processing apparatus 601, the ROM 602, and the RAM 603 are interconnected by means of a bus 604. An input/output (I/O) interface 605 is also connected to the bus 604.

Usually, the following apparatus may be connected to the I/O interface 605: an input apparatus 606 including, for example, a touch screen, a touch pad, a keyboard, a mouse, a camera, a microphone, an accelerometer, a gyroscope, or the like; an output apparatus 607 including, for example, a liquid crystal display (LCD), a loudspeaker, a vibrator, or the like; a storage apparatus 608 including, for example, a magnetic tape, a hard disk, or the like; and a communication apparatus 609. The communication apparatus 609 may allow the electronic device 600 to be in wireless or wired communication with other devices to exchange data. While FIG. 6 illustrates the electronic device 500 having various apparatuses, it should be understood that not all of the illustrated apparatuses are necessarily implemented or included. More or fewer apparatuses may be implemented or included alternatively.

Particularly, according to some embodiments of the present disclosure, the processes described above with reference to the flowcharts may be implemented as a computer software program. For example, some embodiments of the present disclosure include a computer program product, which includes a computer program carried by a non-transitory computer-readable medium. The computer program includes program codes for performing the methods shown in the flowcharts. In such embodiments, the computer program may be downloaded online through the communication apparatus 609 and installed, or may be installed from the storage apparatus 608, or may be installed from the ROM 602. When the computer program is executed by the processing apparatus 601, the above-mentioned functions defined in the methods of some embodiments of the present disclosure are performed.

It should be noted that the above-mentioned computer-readable medium in the present disclosure may be a computer-readable signal medium or a computer-readable storage medium or any combination thereof. For example, the computer-readable storage medium may be, but not limited to, an electric, magnetic, optical, electromagnetic, infrared, or semiconductor system, apparatus or device, or any combination thereof. More specific examples of the computer-readable storage medium may include but not be limited to: an electrical connection with one or more wires, a portable computer disk, a hard disk, a random-access memory (RAM), a read-only memory (ROM), an erasable programmable read-only memory (EPROM or flash memory), an optical fiber, a compact disk read-only memory (CD-ROM), an optical storage device, a magnetic storage device, or any appropriate combination of them. In the present disclosure, the computer-readable storage medium may be any tangible medium containing or storing a program that can be used by or in combination with an instruction execution system, apparatus or device. In the present disclosure, the computer-readable signal medium may include a data signal that propagates in a baseband or as a part of a carrier and carries computer-readable program codes. The data signal propagating in such a manner may take a plurality of forms, including but not limited to an electromagnetic signal, an optical signal, or any appropriate combination thereof. The computer-readable signal medium may also be any other computer-readable medium than the computer-readable storage medium. The computer-readable signal medium may send, propagate or transmit a program used by or in combination with an instruction execution system, apparatus or device. The program code contained on the computer-readable medium may be transmitted by using any suitable medium, including but not limited to an electric wire, a fiber-optic cable, radio frequency (RF) and the like, or any appropriate combination of them.

In some implementation modes, the client and the server may communicate with any network protocol currently known or to be researched and developed in the future such as hypertext transfer protocol (HTTP), and may communicate (via a communication network) and interconnect with digital data in any form or medium. Examples of communication networks include a local area network (LAN), a wide area network (WAN), the Internet, and an end-to-end network (e.g., an ad hoc end-to-end network), as well as any network currently known or to be researched and developed in the future.

The above-mentioned computer-readable medium may be included in the above-mentioned electronic device, or may also exist alone without being assembled into the electronic device.

The above-mentioned computer-readable medium carries one or more programs, and when the one or more programs are executed by the electronic device, the electronic device is caused to: in response to a virtual object controlled by a user moving to a target virtual region in a virtual space, obtain video text information of a target video, in which the video text information is configured to indicate at least one target virtual object included in the target video and at least one action performed by the at least one target virtual object; allow the target virtual object to perform the at least one action in the virtual space based on the video text information; and in response to the at least one action being completed, generate a target video corresponding to the video text information.

The computer program codes for performing the operations of the present disclosure may be written in one or more programming languages or a combination thereof. The above-mentioned programming languages include but are not limited to object-oriented programming languages such as Java, Smalltalk, C++, and also include conventional procedural programming languages such as the "C" programming language or similar programming languages. The program code may be executed entirely on the user's computer, partly on the user's computer, as a stand-alone software package, partly on the user's computer and partly on a remote computer, or entirely on the remote computer or server. In the scenario related to the remote computer, the remote computer may be connected to the user's computer through any type of network, including a local area network (LAN) or a wide area network (WAN), or the connection may be made to an external computer (for example, through the Internet using an Internet service provider).

The flowcharts and block diagrams in the accompanying drawings illustrate the architecture, functionality, and operation of possible implementations of systems, methods, and computer program products according to various embodiments of the present disclosure. In this regard, each block in the flowcharts or block diagrams may represent a module, a program segment, or a portion of codes, including one or more executable instructions for implementing specified logical functions. It should also be noted that, in some alternative implementations, the functions noted in the blocks may also occur out of the order noted in the accompanying drawings. For example, two blocks shown in succession may, in fact, can be executed substantially concurrently, or the two blocks may sometimes be executed in a reverse order, depending upon the functionality involved. It should also be noted that, each block of the block diagrams and/or flowcharts, and combinations of blocks in the block diagrams and/or flowcharts, may be implemented by a dedicated hardware-based system that performs the specified functions or operations, or may also be implemented by a combination of dedicated hardware and computer instructions.

The modules involved in the embodiments of the present disclosure may be implemented in software or hardware. Among them, the name of the module does not constitute a limitation of the unit itself under certain circumstances. For example, the obtaining module may also be described as "a module for obtaining video text information of a target video".

The functions described herein above may be performed, at least partially, by one or more hardware logic components. For example, without limitation, available exemplary types of hardware logic components include: a field programmable gate array (FPGA), an application specific integrated circuit (ASIC), an application specific standard product (ASSP), a system on chip (SOC), a complex programmable logical device (CPLD), etc.

In the context of the present disclosure, the machine-readable medium may be a tangible medium that may include or store a program for use by or in combination with an instruction execution system, apparatus or device. The machine-readable medium may be a machine-readable signal medium or a machine-readable storage medium. The machine-readable medium includes, but is not limited to, an electrical, magnetic, optical, electromagnetic, infrared, or semi-conductive system, apparatus or device, or any suitable combination of the foregoing. More specific examples of machine-readable storage medium include electrical connection with one or more wires, portable computer disk, hard disk, random-access memory (RAM), read-only memory (ROM), erasable programmable read-only memory (EPROM or flash memory), optical fiber, portable compact disk read-only memory (CD-ROM), optical storage device, magnetic storage device, or any suitable combination of the foregoing.

According to one or more embodiments of the present disclosure, a video generation method is provided, the method includes:

in response to a virtual object controlled by a user moving to a target virtual region in a virtual space, obtaining video text information of a target video, in which the video text information is configured to indicate at least one target virtual object included in the target video and at least one action performed by the at least one target virtual object;

the target virtual object performing the at least one action in the virtual space based on the video text information; and in response to the at least one action being completed, generating a target video corresponding to the video text information.

According to one or more embodiments of the present disclosure, the obtaining video text information of a target video includes:

obtaining input text information of the user; and generating and presenting the video text information based on the input text information.

According to one or more embodiments of the present disclosure, the generating and presenting the video text information based on the input text information includes:

generating and presenting original text information based on the input text information; and in response to an edit operation for the original text information by the user, generating the video text information.

According to one or more embodiments of the present disclosure, after a step of obtaining video text information of a target video, the method further includes:

presenting a virtual scene selection interface, in which the virtual scene selection interface presents at least two selectable virtual regions in the virtual space; and receiving a scene selection instruction input by the user, and determining a target virtual scene related to the target video.

According to one or more embodiments of the present disclosure, after a step of obtaining video text information of a target video, the method further includes:

determining a selectable virtual region in the virtual space based on the video text information; and receiving a scene confirmation instruction input by the user, and determining a target virtual scene related to the target video.

According to one or more embodiments of the present disclosure, after a step of determining a target virtual scene related to the target video, the method further includes:

in response to there being a plurality of target virtual scenes, respectively determining an action corresponding to each of the target virtual scenes in the video text information.

According to one or more embodiments of the present disclosure, after a step of determining a target virtual scene related to the target video, the method further includes:

in response to the target virtual region being a first-type virtual region, generating a scene image corresponding to the target virtual scene, and rendering the scene image in a background presentation sub-region of the target virtual region.

According to one or more embodiments of the present disclosure, the target virtual object performing the at least one action in the virtual space based on the video text information includes:

in response to the target virtual region being a second-type virtual region, based on the video text information, the target virtual object moving to the target virtual scene, and performing the at least one action.

According to one or more embodiments of the present disclosure, a video generation apparatus is provided, the apparatus includes:

an obtaining module, configured to: in response to a virtual object controlled by a user moving to a target virtual region in a virtual space, obtain video text information of a target video, in which the video text information is configured to indicate at least one target virtual object included in the target video and at least one action performed by the at least one target virtual object;

an execution module, configured to allow the target virtual object to perform the at least one action in the virtual space based on the video text information; and a first generation module, configured to: in response to the at least one action being completed, generate the target video corresponding to the video text information.

According to one or more embodiments of the present disclosure, a computer-readable medium is provided, a computer program is stored on the medium, when the program is executed by a processing apparatus, the steps of the video generation method according to any one of the embodiments of the present disclosure are implemented.

According to one or more embodiments of the present disclosure, an electronic device is provided, the electronic device includes:

a storage apparatus having a computer program stored thereon; and a processing apparatus configured to execute the computer program in the storage apparatus to implement the steps of the video generation method according to any one of the embodiments of the present disclosure.

The foregoing are merely descriptions of the preferred embodiments of the present disclosure and the explanations of the technical principles involved. It will be appreciated by those skilled in the art that the scope of the disclosure involved herein is not limited to the technical solutions formed by a specific combination of the technical features described above, and shall cover other technical solutions formed by any combination of the technical features described above or equivalent features thereof without departing from the concept of the present disclosure. For example, the technical features described above may be mutually replaced with the technical features having similar functions disclosed herein (but not limited thereto) to form new technical solutions.

In addition, while operations have been described in a particular order, it shall not be construed as requiring that such operations are performed in the stated specific order or sequence. Under certain circumstances, multitasking and parallel processing may be advantageous. Similarly, while some specific implementation details are included in the above discussions, these shall not be construed as limitations to the present disclosure. Some features described in the context of a separate embodiment may also be combined in a single embodiment. Rather, various features described in the context of a single embodiment may also be implemented separately or in any appropriate sub-combination in a plurality of embodiments.

Although the present subject matter has been described in a language specific to structural features and/or logical method acts, it will be appreciated that the subject matter defined in the appended claims is not necessarily limited to the particular features and acts described above. Rather, the particular features and acts described above are merely exemplary forms for implementing the claims. Specific manners of operations performed by the modules in the apparatus in the above embodiment have been described in detail in the embodiments regarding the method, which will not be explained and described in detail herein again.

The invention claimed is:

1. A video generation method, comprising:

in response to a virtual object controlled by a user moving to a target virtual region in a virtual space, obtaining video text information of a target video, wherein the video text information is configured to indicate at least one target virtual object included in the target video and at least one action performed by the at least one target virtual object;

the target virtual object performing the at least one action in the virtual space based on the video text information; and in response to the at least one action being completed, generating a target video corresponding to the video text information.

2. The method according to claim 1, wherein the obtaining video text information of a target video comprises:

obtaining input text information of the user; and generating and presenting the video text information based on the input text information.

3. The method according to claim 2, wherein the generating and presenting the video text information based on the input text information comprises:

generating and presenting original text information based on the input text information; and in response to an edit operation for the original text information by the user, generating the video text information.

4. The method according to claim 1, wherein after a step of obtaining video text information of a target video, the method further comprises:

presenting a virtual scene selection interface, wherein the virtual scene selection interface presents at least two selectable virtual regions in the virtual space; and receiving a scene selection instruction input by the user, and determining a target virtual scene related to the target video.

5. The method according to claim 4, wherein after a step of determining a target virtual scene related to the target video, the method further comprises:

in response to there being a plurality of target virtual scenes, respectively determining an action corresponding to each of the target virtual scenes in the video text information.

6. The method according to claim 4, wherein after a step of determining a target virtual scene related to the target video, the method further comprises:

in response to the target virtual region being a first-type virtual region, generating a scene image corresponding to the target virtual scene, and rendering the scene image in a background presentation sub-region of the target virtual region.

7. The method according to claim 4, wherein the target virtual object performing the at least one action in the virtual space based on the video text information comprises:

in response to the target virtual region being a second-type virtual region, based on the video text information, the target virtual object moving to the target virtual scene, and performing the at least one action.

8. The method according to claim 1, wherein after a step of obtaining video text information of a target video, the method further comprises:

determining a selectable virtual region in the virtual space based on the video text information; and receiving a scene confirmation instruction input by the user, and determining a target virtual scene related to the target video.

9. The method according to claim 8, wherein after a step of determining a target virtual scene related to the target video, the method further comprises:

in response to there being a plurality of target virtual scenes, respectively determining an action corresponding to each of the target virtual scenes in the video text information.

10. The method according to claim 8, wherein after a step of determining a target virtual scene related to the target video, the method further comprises:

in response to the target virtual region being a first-type virtual region, generating a scene image corresponding to the target virtual scene, and rendering the scene image in a background presentation sub-region of the target virtual region.

11. The method according to claim 8, wherein the target virtual object performing the at least one action in the virtual space based on the video text information comprises:

in response to the target virtual region being a second-type virtual region, based on the video text information, the target virtual object moving to the target virtual scene, and performing the at least one action.

12. A non-transitory computer-readable medium having a computer program stored thereon, wherein when the program is executed by a processing apparatus, steps of a video generation method are implemented, the method comprises:

in response to a virtual object controlled by a user moving to a target virtual region in a virtual space, obtaining video text information of a target video, wherein the video text information is configured to indicate at least one target virtual object included in the target video and at least one action performed by the at least one target virtual object;

the target virtual object performing the at least one action in the virtual space based on the video text information; and in response to the at least one action being completed, generating a target video corresponding to the video text information.

13. An electronic device, comprising:

a storage apparatus having a computer program stored thereon; and a processing apparatus configured to execute the computer program in the storage apparatus to:

in response to a virtual object controlled by a user moving to a target virtual region in a virtual space, obtain video text information of a target video, in which the video text information is configured to indicate at least one target virtual object included in the target video and at least one action performed by the at least one target virtual object;

allow the target virtual object to perform the at least one action in the virtual space based on the video text information; and in response to the at least one action being completed, generate a target video corresponding to the video text information.

14. The electronic device according to claim 13, wherein the obtaining video text information of a target video comprises:

obtaining input text information of the user; and generating and presenting the video text information based on the input text information.

15. The electronic device according to claim 14, wherein the generating and presenting the video text information based on the input text information comprises:

generating and presenting original text information based on the input text information; and in response to an edit operation for the original text information by the user, generating the video text information.

16. The electronic device according to claim 13, wherein after a step of obtaining video text information of a target video, the processing apparatus is to:

present a virtual scene selection interface, wherein the virtual scene selection interface presents at least two selectable virtual regions in the virtual space; and receive a scene selection instruction input by the user, and determine a target virtual scene related to the target video.

17. The electronic device according to claim 16, wherein after a step of determining a target virtual scene related to the target video, the processing apparatus is to:

in response to there being a plurality of target virtual scenes, respectively determine an action corresponding to each of the target virtual scenes in the video text information.

18. The electronic device according to claim 16, wherein after a step of determining a target virtual scene related to the target video, processing apparatus is to:

in response to the target virtual region being a first-type virtual region, generate a scene image corresponding to the target virtual scene, and render the scene image in a background presentation sub-region of the target virtual region.

19. The electronic device according to claim 16, wherein the target virtual object performing the at least one action in the virtual space based on the video text information comprises:

in response to the target virtual region being a second-type virtual region, based on the video text information, the target virtual object moving to the target virtual scene, and performing the at least one action.

20. The electronic device according to claim 13, wherein after a step of obtaining video text information of a target video, the processing apparatus is to:

determine a selectable virtual region in the virtual space based on the video text information; and receive a scene confirmation instruction input by the user, and determine a target virtual scene related to the target video.

* * * * *